United States Patent [19]
Rivkin

[11] Patent Number: 4,637,149
[45] Date of Patent: Jan. 20, 1987

[54] SEMI-PERMANENT FILING, FLAGGING AND INDEXING SYSTEM

[76] Inventor: Bernard W. Rivkin, 16287 Oak Creek Trail, Poway, Calif. 92064

[21] Appl. No.: 523,359

[22] Filed: Aug. 15, 1983

[51] Int. Cl.[4] ............ A01B 23/06
[52] U.S. Cl. ............ 40/2 R; 40/593; 40/594
[58] Field of Search ............ 40/2 R, 23 A, 2, 594, 40/595

[56] References Cited

U.S. PATENT DOCUMENTS

| | | | |
|---|---|---|---|
| 1,067,531 | 7/1913 | MacGregor | 40/23 A |
| 2,546,012 | 3/1951 | Owen | 40/2 R |
| 2,636,297 | 4/1953 | Johnson | 40/2 R |
| 2,642,832 | 6/1953 | Brodtmann | 40/23 A |
| 2,816,653 | 12/1957 | Jaconi | 40/2 R |
| 3,106,032 | 10/1963 | Morgan | 40/594 |
| 3,230,649 | 1/1966 | Karn | 40/2 R |
| 3,444,635 | 5/1969 | Seltzer | 40/2 R |
| 3,473,827 | 10/1969 | Leadbetter | 40/2 R |
| 3,535,804 | 10/1970 | Cunningham | 40/2 R |
| 4,204,639 | 5/1980 | Barber et al. | 40/23 A |
| 4,385,460 | 5/1983 | Hanna | 40/2 R |

*Primary Examiner*—Gene Mancene
*Assistant Examiner*—Wenceslao J. Contreras
*Attorney, Agent, or Firm*—Albert L. Gabriel

[57] ABSTRACT

A flag of unitary construction formed from a sheet of flexible, semi-rigid material having a central adhesive section on one side, flanked by two symmetrical adhesive free tabs which are printed so as to facilitate indexing or signaling of flagged material, may be reversibly attached to host material book, file card, file folder or the like proximate a free edge with one adhesive free tab protruding from the free edge host and one tab overlying a portion of the flagged host. The flag may be removed from the flagged host by grasping the adhesive free overlaying tab and peeling the flag outward relative to the free edge of the host without damage to the host, or the flag may be used to flag a section of text not proximate an edge of a host by pressing down the transparent adhesive bearing central section directly over or adjacent to the portion of text to be flagged.

23 Claims, 14 Drawing Figures

FIG. 1
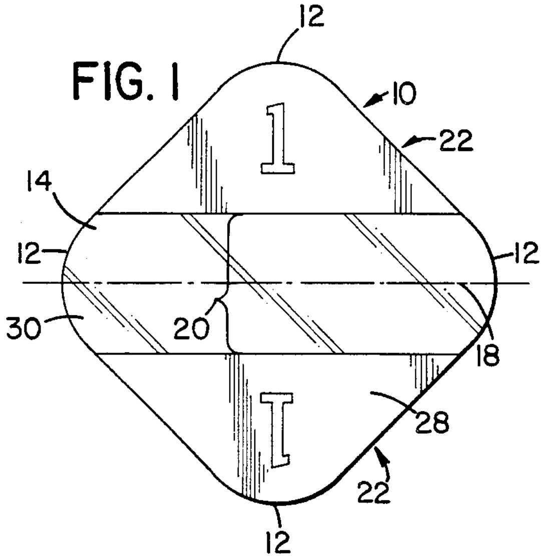
FIG. 2
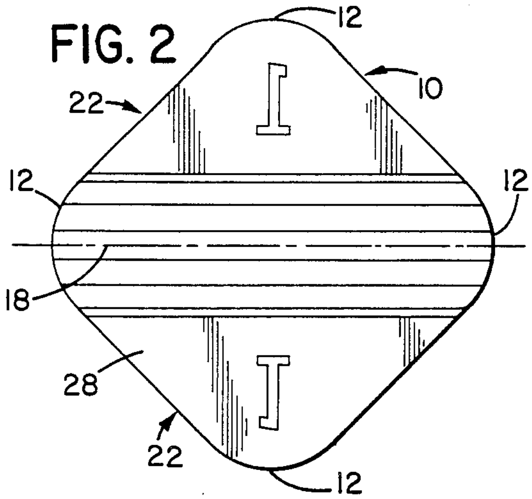
FIG. 3
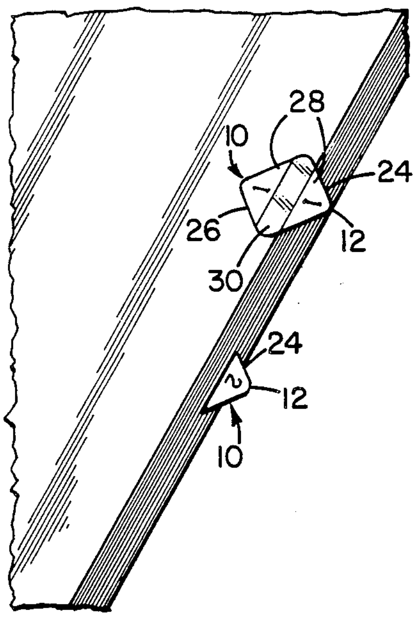
FIG. 4
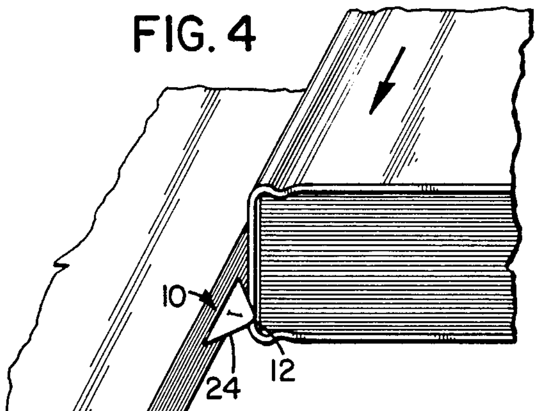
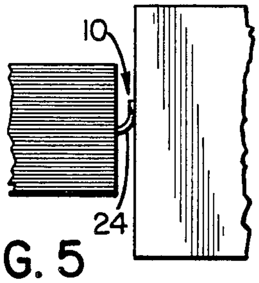
FIG. 5
FIG. 6
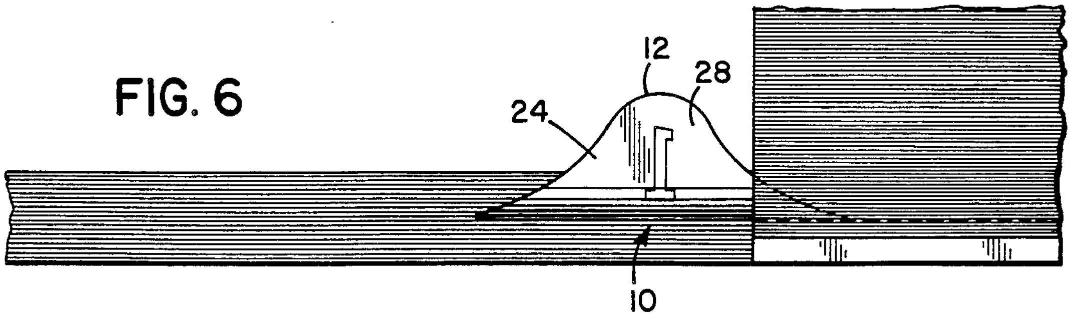

SEMI-PERMANENT FILING, FLAGGING AND INDEXING SYSTEM

BACKGROUND OF THE INVENTION

1. Field of the Invention

The invention relates to indexing and flagging materials and particularly to semi-permanent locator flags and indexing systems thereto pertaining.

2. Description of the Prior Art

Means for the indexing, systemization, and retrieval of information in a referenced source conventionally and at present consist of either three part pronged pieces which are slipped over a page of a book, paper clips, loose media, bookmarks, glue attached indexes, etc. The chief and universal disadvantages of the aforementioned devices lie in their inefficiency and in the damage they frequently cause to the pages and binding of a referenced source. Indexing devices which are not adhesively attached to the printed pages of a referenced source or host either fall out or off of the reference source, while those that are adhesively attached are not readily removable without damage to the indexed page. Additionally, the protrusion of devices attached to a page of a referenced source, especially in the case of glue attached indicia, frequently damage the pages of a reference when struck by a foreign object since they transmit that striking force to the page of the reference. Glue attached indicia are also frequently troublesome to handle since they are functional only in a very specified orientation relative to the page of the reference to be indexed, and frequently require attachment to both sides of the page. Glue attached indicia which are attached to a page of reference source proximate its bound edge, and which overlay a horizontal section of the indexed page or indeed the entire page, are troublesome to apply, unnecessarily bulk out a referenced source when used in any significant number due to their incorporation proximate the binding of the referenced source, and must frequently be treated as pages in and of themselves making them awkward to use, limiting the number of textual units which may be indexed on any given page, or indeed within the entire reference owing to their greater bulk. Some host material is subject to frequent agitation and impact where rigid indicia are unsatisfactory. Host material in some instances must traverse areas where there is not enough clearance for a rigid indicia.

Of the devices which the applicant uncovered during his research in the field of the present invention, U.S. Pat. Nos. 4,214,024, 2,109,583, and 3,312,005 disclose general purpose adhesive devices and are not related to the problems of referenced source indexing. U.S. Pat. No. 3,540,140 discloses a foldable label holder which depends upon the perforation of an indexed sheet and is consequently severely limited in its desirability and use. U.S. Pat. Nos. 1,151,475, 1,848,098, 2,893,144, 3,001,306, 3,191,767, 4,109,759, 3,805,426 reissued as 29,422, and 3,691,662 all make reference to glue attached indexed tab devices which are adhesively attached to both sides of a printed sheet proximate a free edge. As such, they are more troublesome to apply than necessary, and gratuitously bulk out a reference source thereby indexed owing to their double thickness. Only the Stanton U.S. Pat. No. 4,019,759 makes any reference to the removal of such tabs. This is effected in the Stanton Patent by a rotating tab which passes between the adhesive covered section of the index and the flagged page. Such a mechanism, however, requires the indexed tab be of an undesirable rigidity and bulk.

Of indexing devices uncovered which are adhesively attached to only one side of a page to be indexed U.S. Pat. Nos. 1,241,049 and 876,767 refer to devices which are attached to the page proximate its bound edge and which overlay a significant portion of the indexed page. Both would tend to unnecessarily bulk out and clutter any reference source thereby indexed, while U.S. Pat. No. 876,767 discloses an index which is only truly useful for separating major sections of a referenced source. U.S. Pat. No. 1,614,838, also discloses an index tab device which is attached to a printed sheet proximate its bound edge and additionally requires that the device be slipped over the sheet and attached to both sides of the page.

Of the devices disclosed by Patent Search, the indexing means closest to the present invention in spirit is the Rivkin U.S. Pat. No. 2,853,042, granted to the applicant in September, 1958. The indexing means therein disclosed however, relates specifically to the indexing of magnetic recording tape and is not referred to the problems of removing adhesively attached flags from easily damaged host media owing to the far greater strength of magnetic tape.

No device or system has heretofore appeared which provides for the easy and rapid attachment of semi-permanent flagging means on one side of a host proximate a free edge, which does not significantly bulk out a host when utilized in great numbers throughout such a host, transmits no potentially damaging striking force to the host when struck by a foreign object, and provides for easy removal of the flag means without damage to the host.

For the indexing or highlighting of information not proximate a free edge of a host, current practice includes only the underlining of such material with pencil or pen or overlining of the material by means of a highlighting marker utilizing translucent ink. Applicant is aware of no device or system which provides for such indexing and highlighting by means of a semi-permanent transparent adhesively applied flag.

SUMMARY OF THE INVENTION

In view of these and other problems in the art, it is a general object of the present invention to provide a small, semi-permanent flag which may be quickly and easily attached to one side of a host proximate a free edge.

It is another object of the present invention to provide a flag of the character described which may be reversibly attached to a host in either of two orientations.

Another object of the present invention, is to provide a flag of the character described having a central adhesive bearing section flanked by two adhesive free tabs, one of which protrudes from the edge of the host, while the other overlays a portion of the host.

Yet another object of the present invention, is to provide a flag of the character described wherein the adhesive free tabs are tapered so as to enhance the bendability of the flag.

Still another object of the present invention is to provide a flag of the character described wherein the taper of the adhesive free tabs protruding from the host edge together with the bendability of the flag permit the protruding adhesive free tabs to deflect under a striking force by a foreign object thereby transmitting almost none of the striking force to the host.

Still another object of the present invention, is to provide a flag of the character described which may be removed from the host by grasping an adhesive free overlaying tab, and peeling the flag outward with respect to the free edge of the host, thereby avoiding any tearing or other traumatization of the host.

Another object of the present invention, is to provide a flag of the character described which is thin enough so that a great number of such flags may be used to index a bound source reference without significantly bulking out the reference.

Another object of the present invention, is to provide a flag of the character described wherein the adhesive free tabs are symmetrically printed with color and number of letter in order to facilitate the grouping and sequencing of indexed material.

Another object of the present invention, is to provide a flag of the character described having a central transparent section such that a word, number or phrase in the middle of a printed host material may be flagged by attaching the transparent area of the flag directly over the information to be indexed, and the area defined with a narrow printed line around the periphery of the flag.

It is another object of the present invention to provide a flag of the character described having a central transparent area which may be written on by the user in order to facilitate the users organization of the indexed material.

A flag formed of a semi-rigid, flexible material, having a central adhesive bearing section on one side of the flag and two adhesive free tabs flanking the adhesive bearing section, is applied to a host material proximate a free edge of the host with one of the adhesive free tabs protruding from the edge of the host and one of the adhesive free tabs overlying a portion of the flagged host. The application of the flag is reversible insofar as either of the adhesive free tabs may be in the protruding or overlaying position. The adhesive free tabs are tapered in such a way as to enhance the flexibility of the flag and such that whichever adhesive free tab is protruding from the free edge of the flagged host will cam away from and deflect under a striking force from a foreign object. Removal of the flag is effected by grasping the adhesive free overlaying tab, and peeling back the flag outwardly relative to the free edge of the host so that no potentially damaging shearing force is exerted upon the flagged host. The adhesive free tab may be printed with a color coded and/or symbolic sequencing so that the flagged material may be coordinated with other materials similarly flagged and/or imprinted. The flag also has a central transparent section so that specific portions of text in the middle of a host may be highlighted and indexed by simply pressing the flag down over the material to be highlighted such that the desired text is visible through the transparent section and flagged above and below by the printed adhesive free tabs, or enclosed in a line printed around the periphery of the file flag. This transparent section may also be written on by the user in order to facilitate the organization of flagged material.

DESCRIPTION OF THE DRAWINGS

FIG. 1 is a plan view of the obverse side of the flag of the present invention;

FIG. 2 is a plan view of the reverse side of the flag of the present invention;

FIG. 3 is a fragmentary perspective view of the flag as attached proximate the free edge of a sheet of printed material as an indicia in a referenced source;

FIG. 4 is a fragmentary perspective view of the flag of the present invention as attached proximate a free edge of a sheet of printed material in a referenced source with only the protruding tab visible as it is being stuck by a foreign object;

FIG. 5 is a cross-sectional view taken on line S—S in FIG. 4 of the flag of the present invention as it is attached proximate a free edge of a sheet of printed material in a referenced source with only the protruding tab visible. The figure illustrates the deflection of the tapered tab when struck by a foreign object;

FIG. 6 is a fragmentary perspective view of the flag of the present invention as it is attached proximate a free edge of a sheet of printed material in a reference source with only the protruding tab visible. The figure illustrates the deflection of the protruding tab under a striking force exerted by a foreign object. Parts of the protruding tab hidden by the foreign object are indicated by dotted lines;

DETAILED DESCRIPTION OF THE INVENTION

Figure 7:
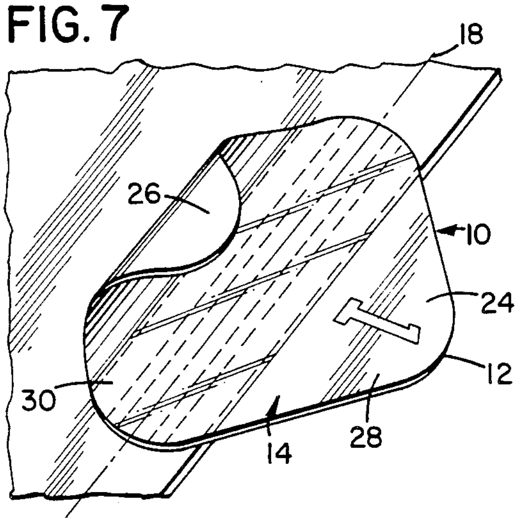
FIG. 7 is a fragmentary perspective view of the flag as it is being removed from a sheet of printed material to which the flag has been attached.

Referring to the drawings and at first particularly to FIGS. 1–3, the flag of the present invention is of a unitary construction, semi-rigid, and is generally designated 10. The flag 10 is made of a thin, preferably 1.5 mils in thickness, elastomeric material, preferably a polyester such as mylar, forming a small preferably substantially square sheet with substantially rounded corners 12. A central adhesive section 20 runs diagonally across what will be referred to as the reverse side 16 of the file flag 10 and defines a longitudinal axis of adhesion 18 and the axis of functional symmetry of the flag 10. The central adhesive section 20 of the flag 10 may utilize a pressure sensitive adhesive which allows the flag 10 to be applied to a surface, removed, and reapplied there or elsewhere.

Here, as elsewhere in this description, longitudinality refers to a dimension collinear or parallel to the diagonal of the flag 10 bearing the central adhesive section 20. The dimension transverse to this diagonal and coplanar with the sheet of the flag 10 will be referred to as latitudinous. The side of the flag 10 which bears the adhesive will be referred to as the reverse side 16 of the flag 10 while the adhesive free side is the obverse side 14. These terms have been used in order to facilitate and clarify the disclosure of the present invention and it is to be understood that they have not been used by way of limitation.

The central adhesive section 20 divides the remainder of the flag 10 into two tapered adhesive free tabs 22 which are symmetrical about the axis of adhesion 18. These tabs 22 are of a substantially identical configuration and are functionally differentiated by the orientation of the flag 10 with regard to the edge of the surface to which the flag 10 is applied. In a primary usage of the present invention, the flag 10 is applied to one side of a sheet of printed media with the axis of adhesion 18 parallel to the edge of the sheet, as indicated in FIG. 3, with one of the adhesive free tabs 22 extending freely outward from the edge of the flagged sheet. In this way, the two tapered adhesive free tabs 22 are differentiated into a protruding, tapered indexing tab 24 and an overlaying tapered indicating tab 26. The protruding indexing tab 24 functions as an indicia or bookmark while the overlaying tab 26 may be used to indicate a section of text on the flagged host. The symmetry of the adhesive free tabs 22 allows these tabs 22 to assume either of the functional roles of protruding tab 24 or of overlaying tab 26 rendering the flag 10 latitudinally reversible. This reversibility allows the flag 20 to be applied in either of two equivalent orientations requiring only that the axis of adhesion 18 be substantially parallel to the edge of the flagged host. Consequently, since the user need not be concerned with which of the tabs 22 protrudes from or overlays the host, the flag 10 may be applied with great rapidity and facility.

The adhesive free tabs 22 are symmetrically tapered at preferably approximately an angle of 45 degrees relative to the axis of adhesion 18. Any greater angle of taper would tend to compromise the camming function of the protruding tab 24, while a lesser angle would not contribute so much to the bendability of the flag 10. Since the taper of the adhesive free tabs 22 may be considered as along an axis transverse to the axis of adhesion 18, once the flag 10 is fixed into place along its axis of adhesion 18, all bendability of the flag 10 will be deflected into a plane orthogonal to that of the flagged host and to the axis of adhesion 18.

FIGS. 4–6 depict the protruding indexing tab 24 being struck by a foreign object after the flag 10 has been affixed to a page of a book to be indexed. The protruding indexing tab 24 is struck along a line parallel to the axis of adhesion 18, which is potentially the most damaging to both the flag 10 and the flagged sheet since the striking force has little or no component parallel to the plane of bendability. The taper of the protruding tab 24, however, causes the tab 24 to act as a cam allowing the protruding tab 24 to deflect under the striking force as indicated in FIG. 6 within the plane of bendability causing no damage to either the flag 10 or the flagged sheet. The rounded corner 12 of the protruding tab 24 completes and enhances the camming action of the protruding tab 24 under a striking force more efficiently than a truncated tab and prevents the tab 24 from catching on a foreign object as might a pointed tab. The flexability of the material from which the flag 10 is formed, the taper of the protruding tab 24, and its culmination in a rounded corner 12, all act in synergistic concert with each other in order to cause the protruding tab 24 to deflect under a striking force rather than transmitting that striking force to the flagged sheet, disrupting and possibly damaging that sheet.

These identical features synergize again as part of the function of the overlaying tab 26 in order to prevent traumatization or damage of the flag sheet in a different manner. The taper of the overlaying tab 26 functions not only as an arrow to indicate a secton of text, but also to facilitate removal of the flag 10 without damage to the flagged host. The transverse orientation of the taper of the overlaying tab 26 relative to the fixed axis of adhesion 18 of the flag 10 increases bendability of the overlaying tab 26 in a latitudinal direction while the fixity of the central adhesive section 20 reduces bendability of the flag 10 in the longitudinal direction. Since the overlaying tab 26 is adhesive free, it may be readily lifted from the face of the flagged host and peeled back outwardly relative to the edge of the host levering the central adhesive section 20 of the flag 10 from the flagged host. The rounded corner 12 of the overlaying tab 26 allows the tab 26 to be caught by the thumb or finger without jabbing the delicate flesh under the nail. Then as the tab 26 is peeled back outwardly relative to the edge of the page, a substantially vertical removal force is applied evenly over an increasing cross-section of the adhesive area 20. The cross-section of the adhesive section 20 being detached from the flagged host increases with the taper of the overlaying tab 26 until the rounded corners 12 pertaining to the longitudinal extremes of the adhesive section 20 smoothly lead into the diminishing cross-section of the protruding tab 24. The elimination of adhering corners further minimizes traumatization of the flagged host during removal of the flag 10. This method of removal by outwardly peeling the flag 10 from the flagged host substantially eliminates any traumatization of the flagged host in terms of shearing force. Tabs which are removed from a sheet by peeling inwardly apply a shearing force to the edge of the page at the longitudinal extremes of these tabs thereby potentially tearing the flagged host. Tabs which lack the bendability necessary to transmit a substantially vertical removal force also apply a horizontal shear to the flagged host thereby potentially marring the surface of the host and destroying any information stored on that surface. Thus, the enhanced flexability of the flag 10 of the present invention and its mode of outward removal minimize the potential of damaging a flagged host by substantially eliminating shear forces in two directions which are normally exerted upon a flagged host during removal of an indexing means.

On the obverse side 14 of the flag 10, the tapered adhesive free tabs 22 bear symmetrically printed flagging areas 28. These printed flagging areas 28 code the flags by means of color and symbolic sequencing, for instance, alphabetically or numerically. These symmetrically printed areas 28 are easily comprehensible as indicated in FIG. 1, when either of the two tapered adhesive free tabs 22 protrudes from a free edge of a flagged host as indicated in FIG. 3. The color coding on the printed flagging areas 28 allows groups of the flags 10 to indicate at a glance the inter-relation of various discrete sections of flagged material. The symbols included in the printed flagging areas 28 allow for the sub-categorization or sequencing of such material. Thus, when it is desirable to visibly reference material contained in a book magazine, file folders or Roladex or time cards, etc., a number of flags 20 may each be applied to one side of discrete pages contained in such media, so that the printed flagging areas 28 coded both by means of color and of symbol protrude beyond the page edges. Thereafter, whenever the user wishes to return to the specific information thereby flagged, he seeks the appropriate color and symbol through an index source. This system is highly adaptable for various individual applications since the flags 10 are coded by both color and number or letter or other symbolic means. When a flag 10 becomes obsolete it is readily removably without damage to the host by peeling off the flag 10 outwardly relative to the free edge of the host. The present system is especially useful when a multiplicity of users are all accessing a single source of information. When several people are working with the same reference, each may be assigned a color for identification so that each has his own group of semi-permanent flags 10 remaining on the reference material without conflict. Within that color grouping, various letters or numbers can indicate sub-categories of interest to the users. A great deal of indexing may be done in this way with any one source since each of the flags 10 is only approximately 1½ mils thick and typically staggered in location through-out the source reference so that a great many of the flags 10 may be utilized without significantly bulking out a bound reference.

Figure 8:
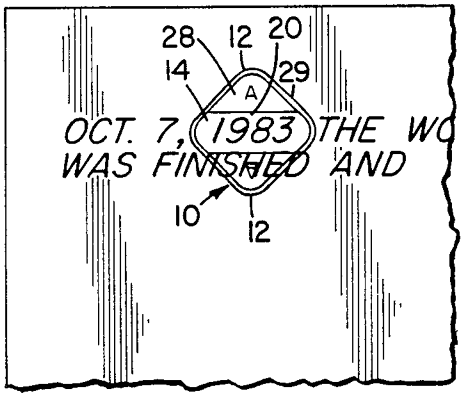
FIG. 8 is a plan view of the flag of the present invention flagging a portion of text in the middle of a page of printed material.

A secondary use of the present system for indexing printed material relates to mid-page flagging. When it is necessary to index a single number, word, phrase, sentence or other section of material in the middle of a reference, a flag 10 may be applied directly over such information in the middle of a page or sheet as indicated in FIG. 8. This use of the flag 10 is enabled by the lack of printing on the obverse side 14 of the flag 10 opposite the central adhesive area 10 on the reverse side 16 of the flag 10. Thus, when the central adhesive section 20 of the flag 10 is affixed directly over information to be indexed, that information is seen through the transparent central textual flagging area 30 of the flag 10 and is highlighted above and below by the symmetrically printed flagging areas 28, or a printed line defining the edge of the flag. In this manner, the importance of minute bits of information with a reference may be made immediately empirically evident. It is possible to incorporate this mid-page flagging use of the present system into the use of the system first described by the manufacture of flags 10 coded only by color with which mid-page material may be flagged. The free edge of the flagged page may be evidently indexed without disrupting any necessary sequencing of the numbered or lettered flags 10. The central transparent textual flagging areas 30 of the flags 10 may also be used for another form of textual flagging. When the flags 10 are utilized proximate a free edge of a host in the manner first described a word or number which may jog the memory of the user when accessing a reference may be scripted by the user upon the transparent textual flagging area 30 of the flag 10 on its obverse side 14 and remain visible and without conflict with the symmetrically printed flagging areas 28. Consequently, the user may create removable marginalia to be utilized in conjunction with host edge indexing and mid-page flagging as part of the triple-faceted systemization information allowed by the present invention. Flags may be prepared in such a way as to permit user writing in area 28 instead of imprinted with number or letters.

Another basic use of the signal flags is in cooperation with an automated sorting or routing. When attached to a host which is then conveyorized, the flag 10 can either mechanically or photoelectrically activate routing and also counting controls. The mechanical method can be a simple microswitch. The photoelectrical controls can be arranged to read printed symbols, light levels as controlled by printed colors or patterning or light reflectivity. The latter can be augmented by making the flags 10 from a metalized semi-rigid flexible material which is imprinted to create patterns of controlled reflectivity which may be identified by a photocell or other light discriminating technique. Since the flags 10 may be attached to a host by automated devices, high speed mail and message sorting and control may be greatly facilitated by use of the flags 10.

Figure 13:
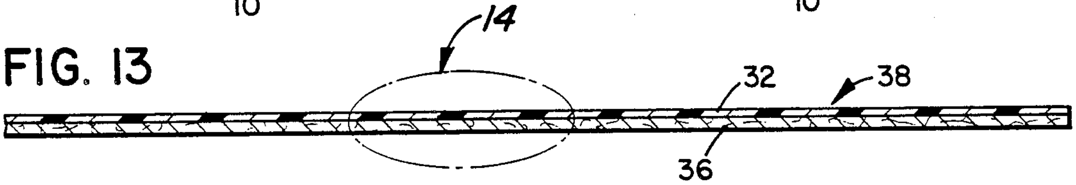
FIG. 13 is a cross-sectional view taken on line 13—13 in FIG. 9.
Figure 14:
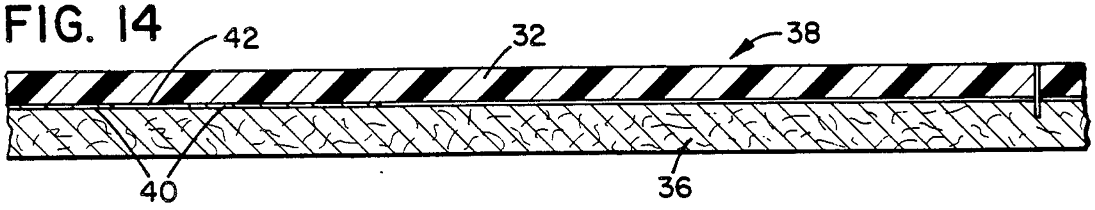
FIG. 14 is a fragmentary cross-sectional view enlarged from the section 14 indicated in FIG. 13.

The manufacture of the flags 10 may be accomplished efficiently and economically in a manner versatile enough to be readily effected by contemporary manufacture techniques. A web 32, preferably approximately 1½ mils in thickness, of strong flexible, tear resistant elastomeric material such as polyester or the like, is printed with number or letters and colors in a discrete pattern 34 such that these numbers, letters or other symbols are readable from one side of the plastic web 32. The other side of the web 32 is then coated with a pressure sensitive, semi-permanent adhesive in such a way that a linear patterning of the pressure sensitive adhesive is left crossing the printed pattern 34 of the plastic web 32 and forming what will become the central adhesive sections 20 of the file flags 10 within the printed pattern 34. The plastic web 32 is then mounted upon a carrier web 36 as indicated in FIG. 13 such that the pressure sensitive adhesive is between the plastic web 32 and the carrier web 36 binding them in a semi-permanent fashion. The combined web 38, is then processed preferably flexigraphically so that the printed pattern 34 on the plastic web 32 is indelibly imprinted upon the plastic web 32. The combined web 38 is then subjected to a die-cut procedure wherein only the plastic web 32 is cut through and remains attached by the pressure sensitive adhesive to the carrier web 36. Resulting from this procedure are the flags 10 of the present invention grouped and affixed to the carrier web 36 from which they may be singly removed. The final manufacturing function is the separation of groups of these numbered, colored adhesive coated flags 10 still mounted on the carrier web 36 into small workable units resulting in small sheets of the combined web 38 each bearing typically from between 8 to 24 flags 10 apiece.

There are several methods by which pressure sensitive adhesive may be applied to the surface of the plastic web 32. Pressure sensitive adhesive in a substantially fluid form, for instance, may be striped across the plastic web 32 by rollers or by brushes or other means, drying in the desired pattern. An entire side of the plastic web 32 may be coated with a pressure sensitive adhesive and then selected portions of the pressure sensitive adhesive may be rendered inactive by deactivating the adhesive, for instance, or by loading the adhesive by means of dusting select areas of the coated plastic web 32, as with a powder, such that areas of the adhesive are permanently bound up and will no longer adhere to other surfaces. A third method is to apply double coated strips of adhesive tape to the plastic carrier web 2 where the strength of adhesion of the tape is biased towards one side. In this manner the tape may be permanently attached to the plastic web 32 while being only semi-permanently attachable to other surfaces through use of two different adhesives.

Figure 9:
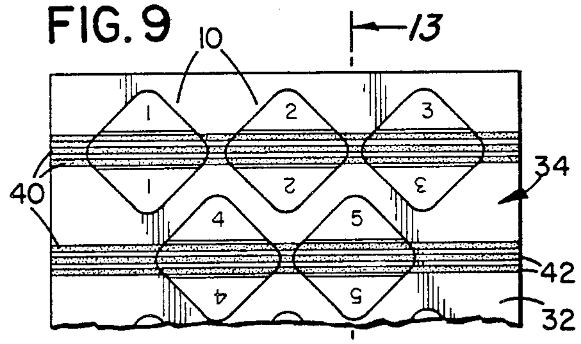
FIG. 9 is a plan view of a sheet of the material from which the flags of the present invention are die-cut indicating a printing array of the flags and one pattern of adhesive striping.
Figure 10:
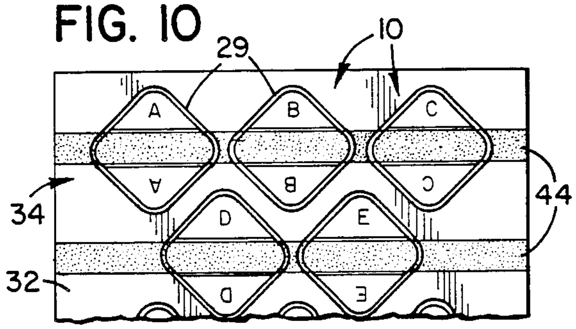
FIG. 10 is a plan view similar to FIG. 9 indicating another pattern of adhesive striping.
Figure 11:
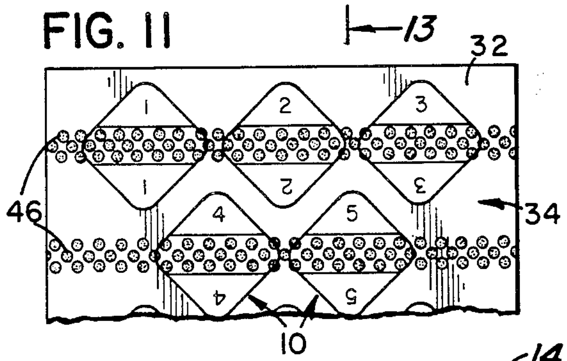
FIG. 11 is a plan view similar to FIG. 9 indicating yet another pattern of adhesive striping.
Figure 12:
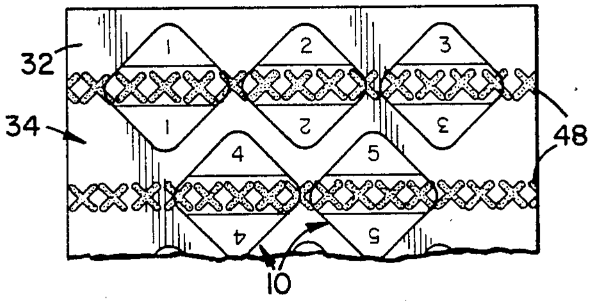
FIG. 12 is a plan view similar to FIG. 9 indicating still another pattern of adhesive striping.

FIGS. 9–12 depict various patternings of the pressure sensitive adhesive on the surface of the plastic web 32. As shown in FIG. 9, the pressure sensitive adhesive may be patterned in a number of thin parallel adhesive stripes 40, separated by adhesive free interstices 42. These multiple stripes 40 form the anchoring means of the flags 10 to a page or a sheet of material to be indexed providing high longitudinal adhesive coverage but far less intense latitudinal coverage. Since the flags 10 are removed laterally with respect to the host, these thin multiple stripes 40 will readily release the host as the flag 10 is peeled back, while otherwise holding the flag 10 firmly in place. The pressure sensitive adhesive may also be applied in single, broad adhesive stripes 44, or in a dot pattern 46, or in an adhesive cross hatching 48 as illustrated in FIGS. 10–12 or other patterns balancing percent of coverage against adhesive characteristics.

In sum, the system of the present invention allows for the effective systemization and retrieval of indexed material from a source reference. The configuration of the flags 10 allow for rapid indexing of a printed media, provide for deflection of the protruding tapered indexing tabs 24 under a striking force rather than disrupting and possibly damaging the indexed material, and for ready removal of the flag 10 without any likelihood of damaging the flagged host. The taper of the adhesive free tabs 22 enhances the deflection of the protruding tapered indexing tab 24 under a striking force and also enables the ready removal of the flag 10 by the peeling back of the overlaying tapered adhesive free indicating tabs 26 outwardly relative to a hosts edge. The particular taper of the adhesive free tabs 22 has experimentally been found to effectively enhance the camming function and bendability of the adhesive free tabs 22. The present invention also allows for the mid-page flagging of information within a printed host in a manner which has hitherto been unknown.

While the present invention has been described with reference to presently preferred embodiments, it is to be understood that alterations may be made by a person skilled in the art without departing from the scope and spirit of the invention as set forth in the appended claims.

I claim:

1. A flag comprising a unitary sheet of thin semi-rigid flexible material having a central adhesive-bearing section on one side and two enlarged adhesive-free tabs flanking said adhesive-bearing section, said flag being adapted to be releasably attached to a host along a proximate free edge of said host such that one of said flag adhesive-free areas protrudes from the edge of said host, while the other flag adhesive-free area overlays a portion of said host.

2. A flag as defined in claim 1, wherein said flag is adapted to be affixed to said host in either of two directions such that either of said adhesive-free areas may protrude from or overlay said host.

3. A flag as defined in claim 2, wherein adhesive-free tabs are substantially symmetrical about a central axis of adhesion.

4. A flag as defined in claim 3, wherein said adhesive-free tabs are symmetrically tapered outwardly from either side of said adhesive-bearing section.

5. A flag as defined in claim 3, wherein said substantially symmetrical adhesive-free tabs are substantially symmetrically provided with symbolic sequencing such that the indexing and organization of flagged material may be facilitated regardless of which of said tabs protrudes from the edge of said host.

6. A flag as defined in claim 5, wherein said substantially symmetrical adhesive-free tabs have color coding which is substantially the same on each of them.

7. A flag as defined in claim 4, wherein said flag is generally square, with the adhesive-bearing section thereof being disposed diagonally within said square.

8. A flag as defined in claim 1, wherein said protruding adhesive-free tab is tapered so as to be able to be cammed away from a striking object, thereby minimizing the transmission of a striking force which might otherwise be potentially damaging to said host.

9. A flag as defined in claim 8, wherein the taper of said protruding adhesive-free tab culminates in a rounded vertex which enhances the camming action of said protruding tab.

10. A flag as defined in claim 8, wherein the taper of said protruding adhesive-free tab enhances the flexibility of said protruding adhesive-free tab.

11. A flag as defined in claim 1, wherein said protruding adhesive free tab is sufficiently flexible to deflect under a striking force, thereby minimizing the transmission of a striking force which might otherwise be potentially damaging to said host.

12. A flag as defined in claim 1, wherein the lateral extent of said adhesive-free overlaying tab is sufficient to be grasped and peeled back outwardly relative to the free edge of said host, thereby facilitating removal of said flag from said indexed sheet with little or no damage to said host.

13. A flag as defined in claim 12, wherein said adhesive-free overlaying tab is tapered in order to facilitate grasping said overlaying tab for removal of said flag from said host, and said taper of said overlaying adhesive-free tab serves to enhance the flexibility of said overlaying tab.

14. A flag as defined in claim 1, wherein the longitudinal extremes of said adhesive-bearing section are rounded such that said longitudinal extremes of said adhesive-bearing section will smoothly release from said host during detachment of said flag, thereby causing little or no damage to said host.

15. A flag as defined in claim 1, wherein said protruding adhesive-free tab has symbolic sequencing thereon in order to facilitate the indexing and organization of flagged material.

16. A flag as defined in claim 1, wherein said protruding adhesive-free tab has color coding thereon.

17. A flag as defined in claim 1, wherein said protruding adhesive-free area is provided with enhanced light reflecting capability.

18. A flag as defined in claim 17, wherein said light-reflecting capability is provided by means of metallization of said flag.

19. A flag as defined in claim 1, wherein said central adhesive-bearing section is substantially transparent, whereby a portion of text printed internally on the host material may be flagged by adhesively attaching said central section of said flag directly over or adjacent to such text portion.

20. A locator flag as defined in claim 1, wherein said protruding area is coded with routing and sorting instructions which may be mechanically interpreted and carried out.

21. A locator flag as defined in claim 20, wherein the coding of said routing and sorting instructions comprises electro-magnetic coding.

22. A locator flag as defined in claim 20, wherein the coding of said routing and sorting instructions comprises light-reflective coding.

23. A located flag as defined in claim 22, wherein said light-reflective coding is enhanced by forming said locator flag of highly light reflective material.

* * * * *